G. J. OGDEN.
ELECTRIC OVEN.
APPLICATION FILED SEPT. 21, 1909.

987,161.

Patented Mar. 21, 1911.

3 SHEETS—SHEET 1.

WITNESSES:

INVENTOR.
George J. Ogden
BY Ridout & Maybee
ATTORNEYS.

UNITED STATES PATENT OFFICE.

GEORGE JOHN OGDEN, OF TORONTO, ONTARIO, CANADA, ASSIGNOR, BY DIRECT AND MESNE ASSIGNMENTS, OF ONE-FIFTH TO MARTIN M. HAY, ONE-FIFTH TO JOHN TEMPLETON, AND ONE-FIFTH TO RODERICK J. PARKE, ALL OF TORONTO, CANADA.

ELECTRIC OVEN.

987,161. Specification of Letters Patent. Patented Mar. 21, 1911.

Application filed September 21, 1909. Serial No. 518,833.

*To all whom it may concern:*

Be it known that I, GEORGE J. OGDEN, of the city of Toronto, in the Province of Ontario, Canada, have invented certain new and useful Improvements in Electric Ovens, of which the following is a specification.

The object of my invention is to devise an electric oven in which food may be cooked with the expenditure of a minimum amount of electric energy.

I accomplish my object by utilizing as the oven chamber a closely sealable, heat insulated casing which is provided with electric heating means. Controlling means are provided whereby after a given temperature is attained within the oven the heating current is automatically cut off and which may be set if desired to automatically maintain a predetermined temperature till the current is manually cut off.

Figure 1:
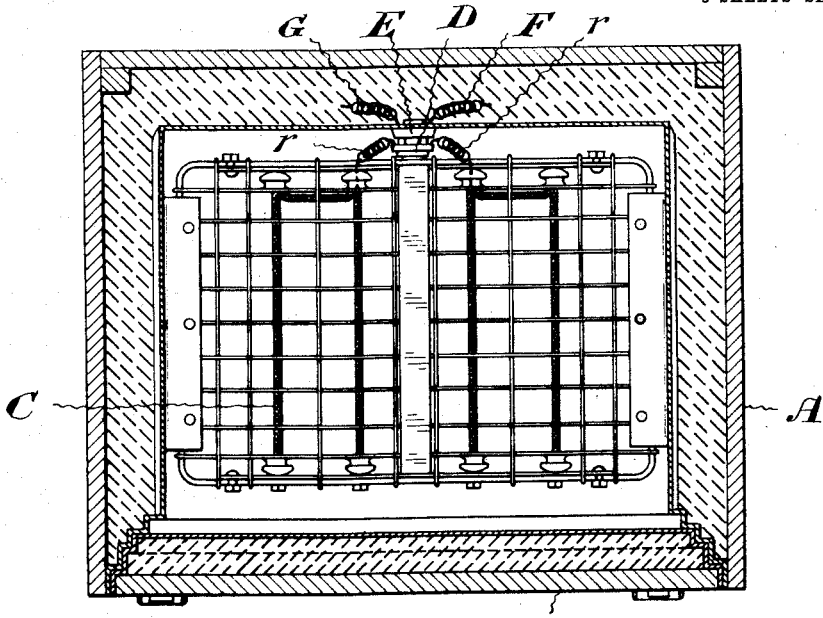
Figure 2:
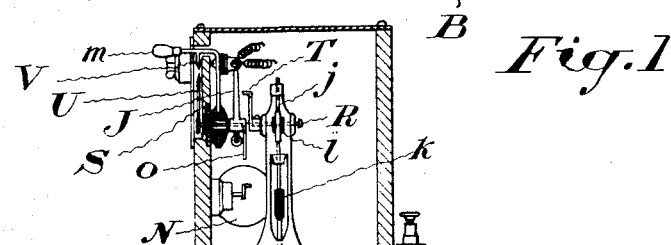
Figure 2:
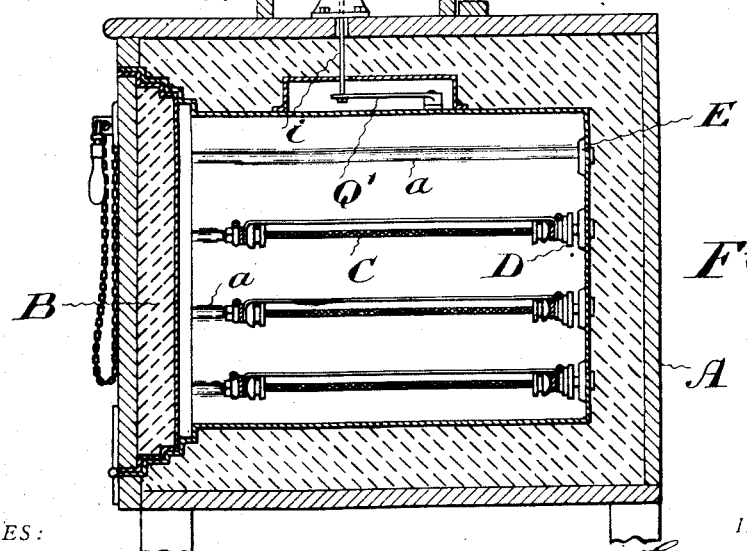
Figure 3:
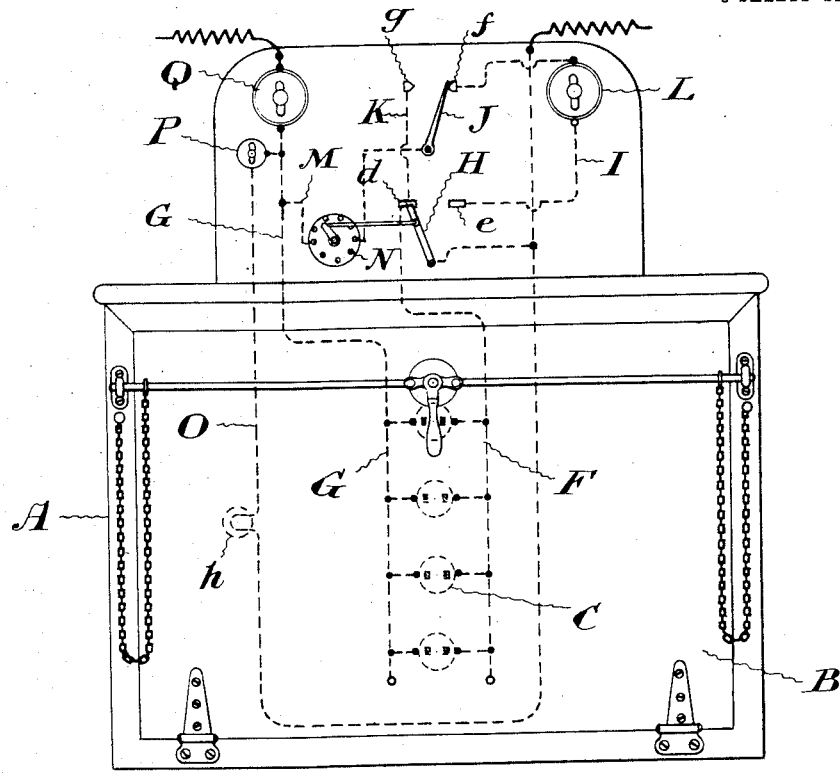
Figure 4:
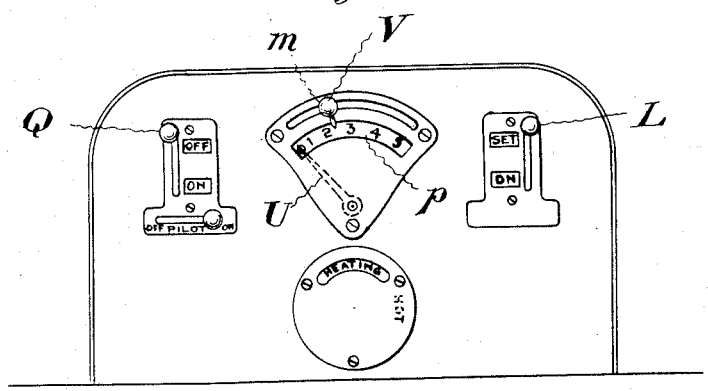
Figure 7:
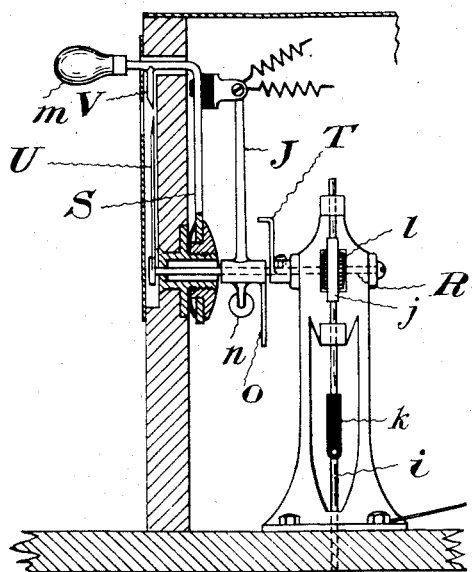
Figure 8:
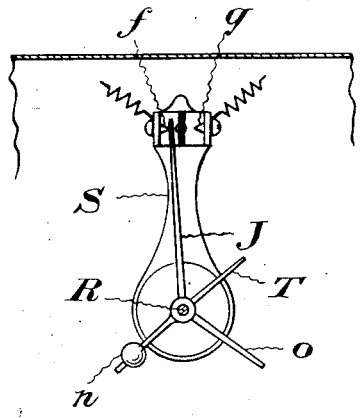
Figure 6:
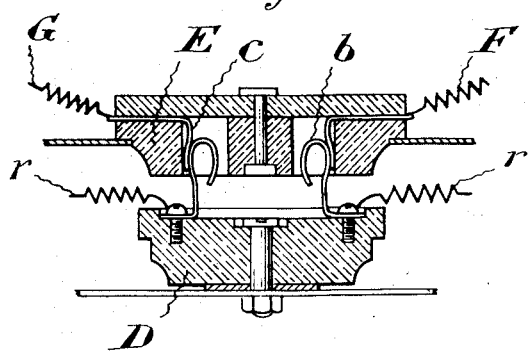
Figure 5:
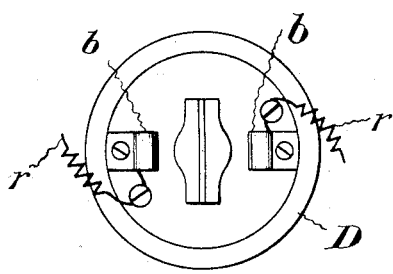

Figure 1 is a horizontal section of an oven constructed in accordance with my invention. Fig. 2 is a vertical section of the same taken from back to front. Fig. 3 is a front elevation showing diagrammatically the wiring system and controlling devices. Fig. 4 is a front elevation of the controlling devices. Fig. 5 is a front elevation of the plug of one of the resistance elements. Fig. 6 is a longitudinal section of one of the plugs and the socket with which it engages. Fig. 7, is an enlarged side elevation of the controlling mechanism. Fig. 8 is a face view of the contact arm and its operating connections.

In the drawings like letters of reference indicate corresponding parts in the different figures.

A is the casing forming the oven chamber. This will be heat insulated in any suitable manner. I show the casing as double walled, the space between the walls being filled with a suitable packing but other means for insulating the casing for heat may be adopted. The door B is preferably fitted in the same manner as the doors of fire-proof vaults and the like and is also suitably packed. The casing when sealed thus forms a cooker of the retained heat type. Such cookers suffer at present from the defect that despite the most careful insulation some of the heat escapes and the temperature runs down. Such cookers also are not adapted for roasting, as the tem- perature of boiling water is the highest temperature ordinarily available therein. I overcome these objections to the ordinary retained heat cooker by providing the oven with means for electrically heating the oven chamber and for electrically maintaining any desired temperature therein as long as may be desired. The means to which I have referred will now be described.

C are the heating elements which may be of any ordinary type and which are in the form of grids on which the food to be cooked may rest. These heating elements may be slid into the oven sliding in the grooves *a* formed in the inner walls thereof. Each element has secured thereto a porcelain plug D carrying the spring fingers *b* which are secured to the plug and project through holes therein. Secured in the back wall of the oven are a plurality of sockets E each having openings therein to receive the spring fingers *b*. Within these openings are secured the spring fingers *c* with which the fingers *b* contact, as shown in Fig. 6, when a heating element is pushed into place in the oven. This enables as many heating elements to be employed as may be necessary to suit the temperature desired and the quantity of food to be cooked. The fingers *b* are electrically connected with the heating elements C by means of the wires *r* and the fingers *c* are connected to the wires F and G of the main circuit. As indicated in the wiring diagram, Fig. 3, the heating elements are connected in parallel. As I desire that the electric current shall be cut off as soon as a certain temperature is reached, and either allowed to remain off or else automatically switched on or off to cause the maintenance of the desired temperature when reached, I provide the following mechanism, which will be best understood on reference to the aforesaid wiring diagram. In one of the wires of the main circuit is located a switch H of any suitable type. I show this switch located in the wire F. This switch is adapted not only to make contact with the contact piece *d* but also with the contact piece *e* to which is connected the wire I leading to the contact piece *f* such contact being effectuated in any of the well known ways, as by the use of abutment posts, or spring jaws between which the switch arm passes. A contact finger J is adapted to play between the contact piece *f* and the contact piece *g* to which is connected the wire K, the other end of which is connected with the main circuit wire F between the switch H and the heating elements, preferably as shown at the contact piece *d*. The wire M connects the contact finger J with the main circuit wire G. In series with the wire M is the field of a switch changing device, preferably a rotary induction motor, as indicated in the wiring diagram. Of course other switch operating devices might be substituted.

O is a circuit including an incandescent lamp *h* which may be used for lighting the oven. P is a switch in this circuit and Q is a switch in the main circuit by means of which the current may be turned on and off independent of the automatic switch.

Though a specific description will be given hereinafter it may be stated here that the contact finger J is operated by a thermostat exposed to the heat within the oven while the contacts *g* and *f* are movable together so that the contact finger J will play between them at temperatures a few degrees above and below a given temperature.

Any construction ordinarily employed may be used for the various switches and the switch changing motor, but as certain novelties of construction are employed in the arrangement of the thermostat and the connections whereby it operates the contact finger J these will be now particularly described. These are best seen on reference particularly to Figs. 2, 4 and 7 of the drawings. The thermostat Q' is of the usual compound metal bar variety and is preferably secured within the wall of the casing and separated from the interior of the casing by the inner lining thereof. To the free end of the thermostat is secured a connecting rod *i* carrying a rack *j* movable in suitable guides. As the upper end of the connecting rod is a conductor an insulating section *k* is inserted in the connecting rod. The rack *j* meshes with a pinion *l* on the suitably journaled spindle R. Loose on this spindle is the contact finger J. This contact finger is adapted to play as hereinbefore described between the contact pieces *f* and *g*, which are connected to but insulated from the arm S. This arm is suitably secured to a hub journaled to the frame of the controlling mechanism in any suitable manner and is provided with a knob *m* whereby it may be moved to vary the position of the contact pieces carried thereby. The finger J is provided with a weight *n* which tends to maintain it in contact with the contact piece *f*. Secured to the spindle R is a bent finger T which when the spindle is rotated by the operation of the thermostat is moved to contact with the tail *o* formed on or secured to the finger J. The end of the spindle R carries the index finger U which moves over the face of the scale *p* secured to the front of the frame of the controlling apparatus, and constructed to indicate degrees of heat. An index finger V is secured to the arm S and coöperates with the same scale. The operation of this device is as follows: Presuming that a certain temperature is to be attained the arm S is moved till the index finger thereon is opposite the desired temperature as indicated on the scale. This moves the contact pieces *f* and *g* but the contact finger J is still retained in contact with the contact piece *f* as already described. As the position of the contact finger and its tail *o* thus varies the position of the tail *o* relative to the bent finger T is also varied. As the temperature in the oven rises the thermostat by its bending movement rotates the spindle through the medium of the rack J and spindle L and causes the bent finger T to move toward the tail *o*. As soon as it touches this tail it moves the contact finger away from the contact piece *f* and the controlling device is operated as already described. It is evident also that the position of the tail *o* relative to the finger T is variable to suit the degree of temperature required, being farther away when high temperatures are required and closer to it when lower temperatures are required. The parts may, it is evident, be so adjusted that the thermostat will control the device accurately through its movements of the contact finger J to enable any desired temperature to be attained or maintained.

The details of the switch operating motor being immaterial are not shown in detail but will be clearly understood from the wiring diagram.

The operation of the electric control thus described is as follows: When the oven is being heated the switch H will be in the position shown that is in contact with the contact piece *d*. A circuit is thus completed through the wire F, switch H, heating element C and wire G. We will assume at this point that the switch L in the wire I is closed. As the temperature in the oven rises the contact finger J gradually moves away from the contact point *f* against which it has been lying and moves toward the contact point *g* under the action of the thermostat hereinbefore referred to. As soon as the contact finger touches the contact piece *g* a shunt circuit is completed through the wire G, wire M, motor N, contact finger J, contact *g*, wire K, contact *d* and switch H and the other terminal. The motor instantly operates and throws the switch H over into contact with the contact piece *e* thus breaking the main circuit. This also it will be seen breaks the circuit through the motor which at once stops leaving the current switched off. As the oven cools, by the action of the thermostat the contact finger J begins to move back toward its original position in contact with the contact piece $f$. As soon as it touches this contact piece a circuit is again completed through the wire M, motor N, contact finger J, contact $f$, the wire I, contact $e$, the switch H and the other terminal. The motor again operates moving the switch H back to its original position and this process of switching on and off is repeated automatically as long as the temperature is rising and falling in the oven. In the wire I is placed a switch L by means of which the circuit through the wire may be opened or closed. When the device is operating as above described the switch is closed. If, however, the switch L be opened as soon as the contact finger J has been moved to contact with the contact piece $g$ and the motor thus operated to open the switch H the switch H remains open since the return of the contact finger to engagement with the contact piece $f$ can no longer complete the shunt circuit through the wire I and switch H. Thus it will be seen that as I have arranged the device a predetermined temperature when attained can be maintained in the oven as long as may be desired, or if necessary by opening the switch L the current may be completely cut off as soon as a desired temperature is attained and the contents of the oven allowed to continue cooking by the retained heat alone.

From the above description it will be seen that I have devised an electric oven which will accomplish satisfactorily the objects set out in the preamble to this specification. It is found that the ordinary electric oven is expensive to operate owing to its large consumption of electric energy. The ordinary retained heat cooker is also defective inasmuch as there is no means of replacing the heat which is gradually lost, making the operation of cooking rather slower than is absolutely necessary. By my arrangement I combine the advantages of the retained heat cooker with all the advantages derived from an absolute control of the temperature therein, which control is absolutely automatic. The great economy of my device is of course due to the conservation of the heat by the closely sealable heat insulated casing and the automatic regulation of the consumption of energy whereby the useless consumption of energy is absolutely prevented.

What I claim as my invention is:—

1. Cooking apparatus comprising a casing in combination with electric means for heating the interior of the casing; and means for automatically breaking the heating circuit as soon as a predetermined temperature is attained within the casing and for maintaining the break in the circuit until conditions are manually established for the automatic closing of the circuit on a fall in temperature and manually controllable means for establishing or disestablishing such conditions.

2. Cooking apparatus comprising a casing in combination with electric means for heating the interior of the casing; means for automatically breaking and making the heating circuit controlled by the rise and fall of the temperature within the casing; and manually controlled means whereby the device may previously be set to maintain the break in the circuit after the circuit has been automatically broken.

3. An oven in combination with an electric heating device therefor; a switch in circuit with the heating device; a thermostat exposed to the heat within the oven; a motor for moving the switch arranged in a shunt circuit; and means whereby the thermostat is adapted to alternately close and open the shunt circuit and thus cause the operation of the motor to open the switch; and manually controlled means whereby the device may previously be set to maintain the break in the circuit after the circuit has been automatically broken.

4. The combination of an electric heating element; a main circuit in which said element is inclined; a switch in said circuit; a shunt circuit across the main circuit having a gap therein; a motor adapted to operate the switch and included in the shunt circuit; a contact arm adapted to open and close the gap in the said shunt circuit; a thermostat adapted to move said contact arm; a contact with which the contact arm may engage when moved to break the shunt circuit; a contact with which the switch may engage when moved to break the heating circuit; a wire connecting the last mentioned contacts; and a manually operable switch in said wire.

5. An oven provided with an electric contact socket having two contacts therein in combination with a removable electric heating element having a contact plug with two contacts thereon connected to the heating element and adapted to engage the said socket, and complete the electrical connections when the heating element is put in place.

6. An oven provided with a plurality of electric contact sockets having two contacts therein in combination with a removable electric heating element having a contact plug with two contacts thereon connected to the heating element and adapted to engage any one of the said sockets and complete the electrical connections when the heating element is put in place.

7. In electric heating apparatus the combination of a thermostat; a spindle; means whereby the spindle may be rocked by the movement of the thermostat; a contact arm loose on said spindle; a pair of contacts between which the arm may play; yielding means tending to maintain the said arm in contact with one of said contacts; an arm fixed to said spindle and adapted when the spindle is rocked by the movement of the thermostat to engage the said contact arm to move it toward the second contact; a heating element; and means whereby the movements of said contact arm between the said contacts controls the supply of electric energy to said heating element.

8. In electric heating apparatus the combination of a thermostat; a spindle; means whereby the spindle may be rocked by the movement of the thermostat; a contact arm loose on said spindle; a pair of contacts between which the arm may play; yielding means tending to maintain the said arm in contact with one of said contacts; an arm fixed to said spindle and adapted when the spindle is rocked by the movement of the thermostat to engage the said contact finger to move toward the second contact; a heating element; means whereby the movements of said contact arm between the said contacts control the supply of electric energy to said heating element; and means for adjusting said contacts and contact arm relative to the fixed arm.

Dated, this 10th day of Sept. 1909.

GEO. JOHN OGDEN.

Signed in the presence of—
J. EDW. MAYBEE,
JOHN G. RIDOUT.